United States Patent [19]

Donachiue

[11] 4,251,583
[45] Feb. 17, 1981

[54] HUMIDIFIER PAD

[76] Inventor: James P. Donachiue, 133 Richmond Street West, Toronto, Ontario, Canada, M5H 2L7

[21] Appl. No.: 9,744

[22] Filed: Feb. 5, 1979

[51] Int. Cl.³ .......................... B32B 3/10; B32B 5/14; B32B 27/14
[52] U.S. Cl. ..................................... 428/137; 261/92; 261/95; 261/104; 261/107; 428/171; 428/172; 428/198
[58] Field of Search ..................... 261/92, 95, 83, 104, 261/107; 55/527; 428/131, 137, 138, 198, 170, 171, 172, 195–197, 304, 305, 317

[56] References Cited

U.S. PATENT DOCUMENTS

| | | | |
|---|---|---|---|
| 1,625,663 | 4/1927 | Kelly | 261/104 |
| 2,862,251 | 12/1958 | Kalwaites | 428/131 X |
| 3,481,588 | 12/1969 | Lobb | 261/92 |
| 3,954,920 | 5/1976 | Heath | 261/104 |
| 3,989,867 | 11/1976 | Sisson | 428/128 X |
| 4,075,382 | 2/1978 | Chapman et al. | 428/198 X |
| 4,103,058 | 7/1978 | Humlicek | 428/401 X |
| 4,143,195 | 3/1979 | Rasmussen | 428/198 X |

Primary Examiner—William J. Van Balen

[57] ABSTRACT

The specification describes an improved humidifier pad and a method of making the pad. The pad comprises a fibrous layer provided with means which substantially eliminate the flow of water picked up by the fibrous layer along the length of the pad so that when the pad is in use on a rotating drum, the water that is picked up is held in the pad for vaporization rather than flowing back downwardly to the pickup point.

12 Claims, 7 Drawing Figures

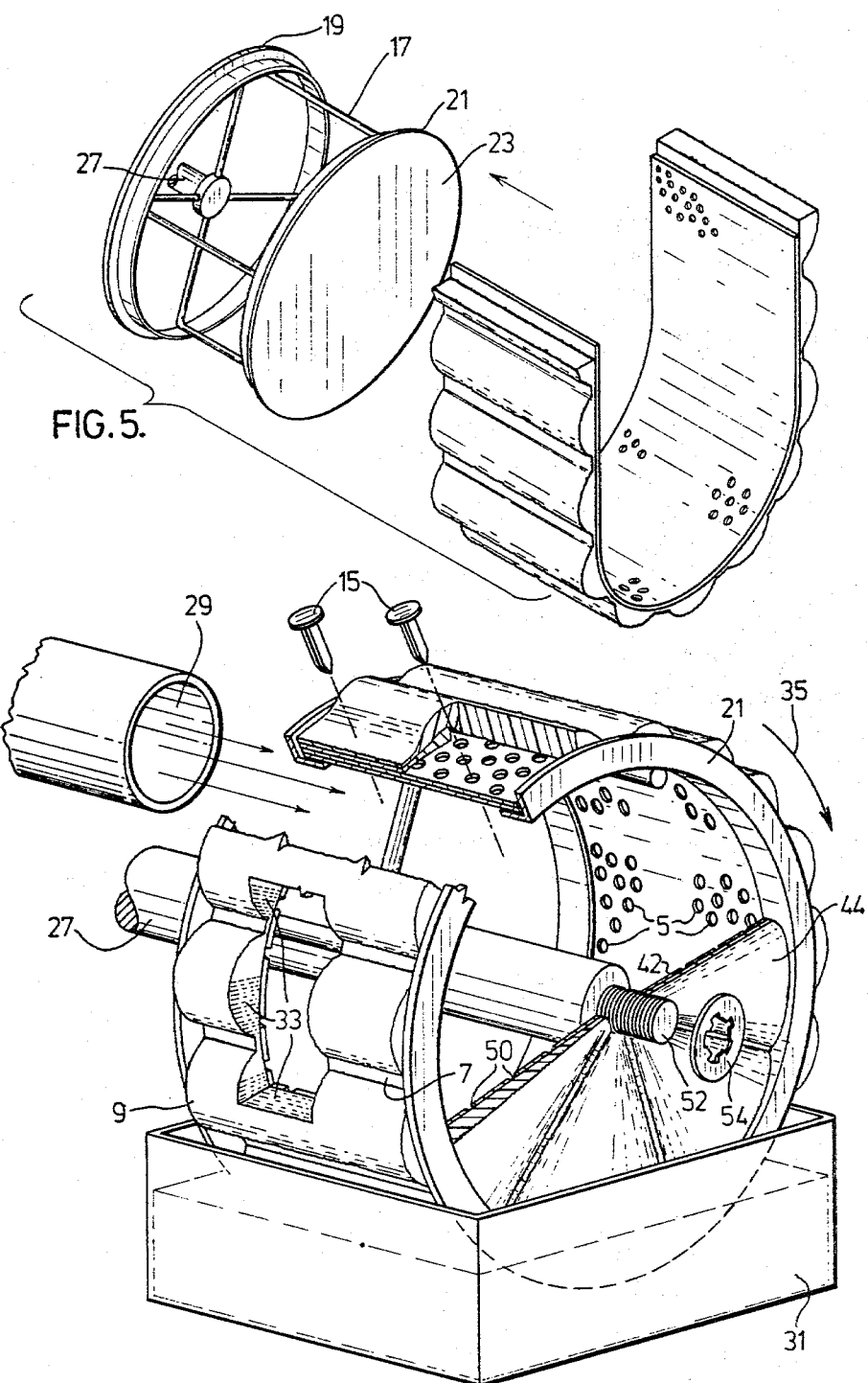

HUMIDIFIER PAD

FIELD OF THE INVENTION

The present invention relates to improvements in humidifier pads.

BACKGROUND OF THE INVENTION

Humidifiers use an arrangement in which an endless humidifier pad is fitted over some type of rotating drum arrangement and the pad is rotated about a horizontal axis. The lower reach of the pad passes through an open pan of water or the like from which it picks up water. At the same time, air is forced outwardly from within the inner confines of the pad and through the pad to vaporize the water and humidify the surrounding air.

Conventional humidifier pads are however less than efficient in a number of respects, a primary one of which is that they are not able to effectively carry the picked up water during the vertical travel of the belt and at the same time to effectively disperse the water for humidifying. In other words, the water which is picked up tends to immediately flow back down to the pickup point. This problem has long been recognized and some humidifiers such as that disclosed in Canadian Pat. No. 816,489 issued July 1, 1969 employ means for returning the water which runs off the pad back to the pan or reservoir. However, this obviously does not increase the efficiency of the pad.

The present invention provides a highly efficient humidifier pad means and method of making same. The humidifier pad means comprises a fibrous layer provided with high density zones adapted to substantially eliminate the downward gravitational flow across the zones by the water which is picked up by the humidifier pad means as it is passed through a water reservoir so that during the vertical movement of the humidifier pad means the amount of water draining back to the reservoir is insignificant and most of the water picked up by the fibrous layer is held in the pad means and dispersed over its surface for vaporization to the surrounding air.

The pad means can also be used to replace the standard solid end wall of a conventional rotating drum which maximizes the humidifying capacity of any humidifier on which the pad means is used.

BRIEF DESCRIPTION OF THE DRAWINGS

The above as well as other features and advantages of the present invention will be described in greater detail with respect to the drawings, wherein:

FIG. 5 is a perspective view of a strip form of humidifier pad according to the present invention to be secured to a rotating drum; and FIG. 6 is a perspective view of a humidifier pad according to an embodiment of the present invention wrapped about a rotating drum with the lower reach of the pad immersed in a water reservoir and showing sections of the pad after having travelled through the reservoir.

DETAILED DESCRIPTION ACCORDING TO THE PREFERRED EMBODIMENTS OF THE PRESENT INVENTION

The humidifier pad of the present invention is as mentioned above, adapted such that there is little or no flow of water back to the water reservoir from which the water is picked up. In accordance with the present invention, the pad is constructed with zones in the fibrous material. The fibrous material in each zone is of increased density relative to the fibrous material between the zones and is of sufficiently high density to substantially eliminate the flow of water across each zone. In the case of the humidifier pad, as opposed to the endwall structure, these zones are spaced from one another along the length of the pad and each zone extends across substantially the entire width of the pad, so that as the humidifier pad rotates with the drum, the water which is picked up is held by these zones from flowing back into the water reservoir. Therefore, the primary escape for the water picked up is by vaporization to the surrounding air.

In cases where the humidifier pad means forms the rotating drum endwall these zones of increased density diverge outwardly from one another from the central region to the outer periphery providing the pad endwall with a cut pie configuration. As the drum rotates the high density zones substantially eliminate the downward flow of water across the zones back to the water reservoir.

These high density zones are generally very narrow i.e. in the order of $\frac{1}{8}$ to $\frac{1}{2}$ inch so that they occupy only a very minor portion of the fibrous layer. The bulk of the fibrous layer is of a loose woven material for maximum dispersion of water across the width of the pad.

Figure 1:
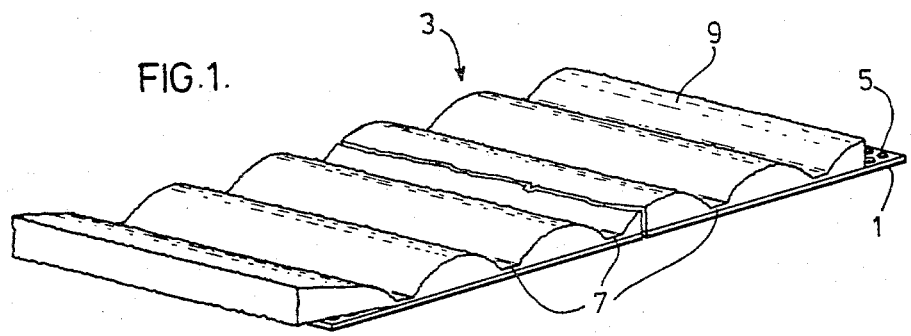
FIG. 1 is a perspective view of a section of a humidifier pad according to a preferred embodiment of the present invention.
Figure 2:
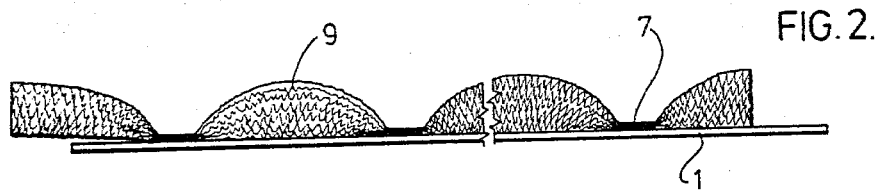
FIG. 2 is a side view showing a short section of humidifier pad in accordance with an embodiment of the present invention.
Figure 4:
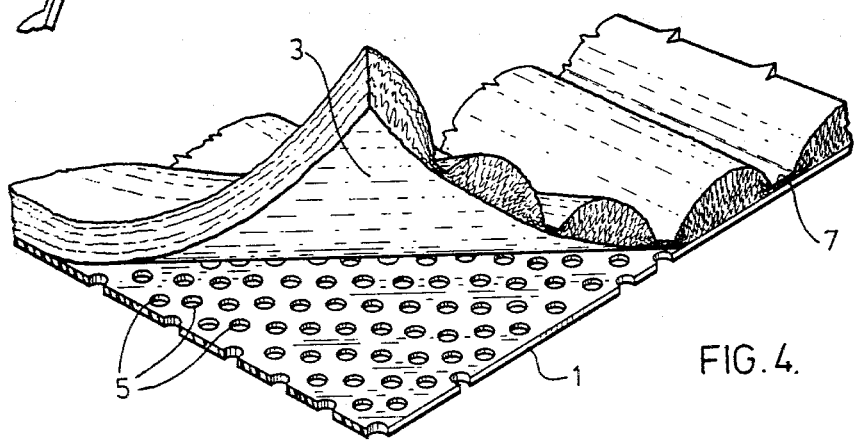
FIG. 4 is a perspective view of an embodiment of a humidifier pad according to the present invention showing partial separation of the fibrous layer from the reinforcing layer.

A number of methods can be used to provide high density zones in the fibrous material and a particularly good arrangement is best shown in FIGS. 1, 2, and 4 of the drawings. This embodiment comprises a reinforcing layer 1, which is constructed from plastic materials such as vinyl and the like. Secured to the reinforcing layer is a fibrous layer, generally indicated at 3 and formed from materials such as a non-woven polyester. The two layers are secured to one another by means of heat-sealing at junctures 7 spaced by about 1¼" from one another along the length of the pad. Each one of these junctures extends all the way across the width of the pad.

The head-sealing performs two functions; one of which as mentioned above, is to secure the two layers to one another. The second function of the heat-sealing is to compress the fibrous material and increase its density to the extent that there is a barrier to the gravitational flow of water across each of the junctures. However, the mounds 9 of fibrous material between the junctures are substantially unaffected by the heat-sealing so that they maintain their extremely good water dispersion characteristics.

Again it should be noted that the heat-sealed junctures occupy only a very minor portion of the overall surface of the humidifier pad so that the bulk of the fibrous layer functions in dispersing or breaking the water down into very fine droplets for evaporation to the surrounding air. As is best seen in FIG. 4, the reinforcing layer is perforated as indicated at 5 so that the water droplets in the fibrous layer can be vaporized and carried off by the air which is forced from a blower within the inner confines of the pad.

The fibrous layer itself can be made of different thicknesses depending upon the C.F.M. of the machine on which the pad is to be used. In cases where the C.F.M. is low the fibrous material is a single layer in thickness. In cases where the C.F.M. of the machine is high and more air is supplied to the machine the thickness of the fibrous layer is increased so that it will hold more water for vaporization to the surrounding air.

According to a preferred method of the present invention, the humidifier pad is formed from a strip of plastic material with a corresponding strip of non-woven fibrous material heat-sealed to the plastic material. The makeup of the two materials permits bonding by heat-sealing and the flatness of the strip pad minimizes the space that it occupies for shipping purposes so that a large number of pads can be shipped at one time.

Figure 3:
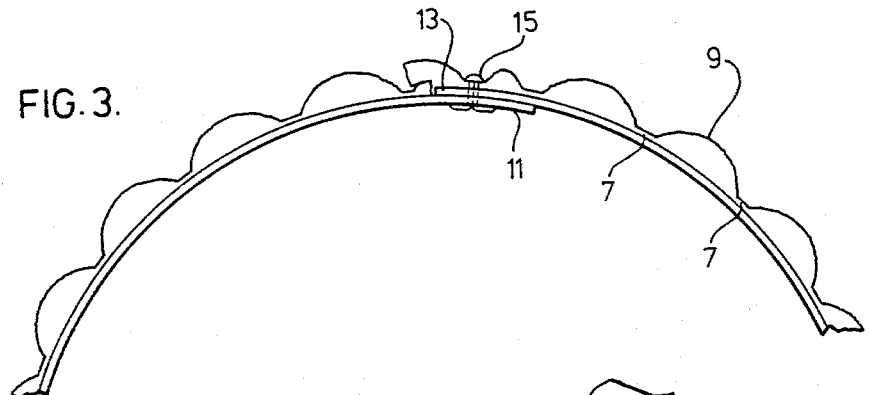
FIG. 3 is a second side view showing a preferred arrangement for securing an embodiment of the humidifier pad in an endless configuration.

In addition, the flat strip pad is extremely easy for the consumer to work with. As can be seen in FIGS. 5 and 6, a rotating drum or squirrel cage, generally indicated at 16, is provided with peripheral shoulders 19 and 21, which prevent the pad from sliding off the drum. An endless pad must be stretched to fit over a squirrel cage having these shoulders and may not have the resiliency or tightness of fit to snap into a proper locking position on the drum, so that it may in fact slip when it is weighted with water while the drum is rotating. On the other hand the pad may be so tight that it is difficult to mount without breaking the squirrel cage and one of the major problems encountered by humidifier manufacturers is that they are not able to keep up with the replacement of lipped squirrel cages broken by the consumer. Howerver the strip construction of the preferred embodiment overcomes these difficulties since the pad is first located in place on the drum with the free ends 11 and 13 of the pad overlapped and secured in the overlapped position by means of fastening pins 15 or other suitable securing means as shown in FIG. 3. The fastening pins can be fitted directly through the perforations 5 or alternative apertures may be appropriately positioned in the pad for receiving the fastening pins. The fastening pins shown in the drawings are resuable and include a head portion and a pair of separable malleable legs, which makes it extremely easy to remove the pad from the drum for purposes of cleaning or replacing the pad. Furthermore, the use of the fastening pins and appropriately located perforations or apertures assures that the user can wrap the pad about the drum as tightly as is necessary to prevent its slipping during drum rotation without damaging the drum.

The vinyl layer of the present humidifier pad, not only reinforces the overall structure of the pad, but also provides an additional surface at both of the pad free ends through which the pins can properly secure the pad.

In cases where the squirrel cage includes something other than a permanent lip for securing it in place the pad may be preformed for sliding directly onto the cage. Furthermore some cages are provided with a screen covering which provides support as the reinforcing layer for the humidifier pad of the present invention. In cases where the reinforcing layer is not used the heat-sealing method still provides high density zones in the fibrous material.

Two humidifier arrangements according to the present invention are shown in FIGS. 5 and 6 of the drawings. The arrangement of FIG. 5 includes a conventional rotating drum, which is supported by means of main axle 27 and interior spindles 17. The drum includes a solid endwall 23 and is open at the other end.

Figure 7:
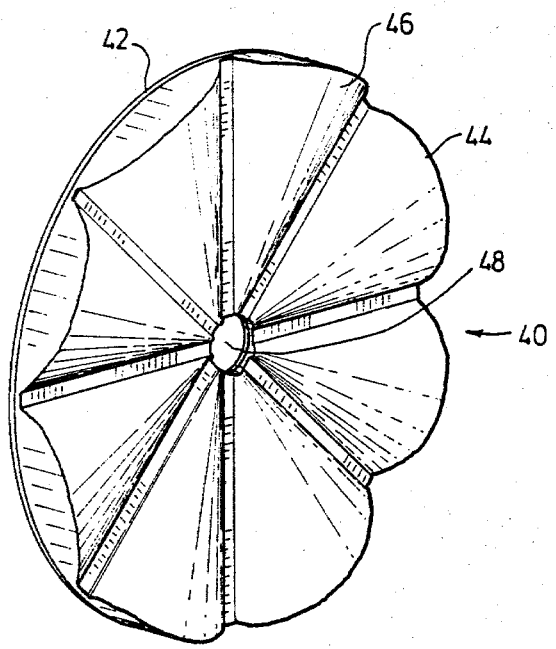
FIG. 7 is a perspective view of the end wall for the humidifier arrangement shown in FIG. 6.

The arrangement shown in FIG. 6 is somewhat different from that of FIG. 5 and is adapted for use with machines having a higher C.F.M. This arrangement rather than using a solid end wall employs and end wall as shown in FIG. 7, and is constructed in accordance with the present invention for maximizing the amount of fibrous material from which water can be vaporized. Referring to FIG. 7 the endwall generally indicated at 40 comprises a reinforcing layer 42 and a fibrous layer 44 heat-sealed to the reinforcing layer at junctures 46 spaced around the endwall such that there are again mounds of loose fibrous material between the heat-sealed junctures. The reinforcing layer and the fibrous layer are made of materials consistent with that used in the pad above and the reinforcing layer is perforated as indicated at 50 in FIG. 6. Endwall 40 is provided with a central aperture 48 adapted to fit over end 52 extending from the central spindle as shown in FIG. 6. The endwall is then secured in place by means of quick release nut 54 fitted over the spindle end. The remainder of the squirrel cage as well as the humidifier pad in FIG. 6 are identical to that shown in FIG. 5 and have been numbered accordingly.

When the humidifier is in operation with the humidifier pad secured over the squirrel cage air is forced through a pipe 29 located at the open end of the squirrel cage into the interior confines of the squirrel cage and humidifier pad. The lower reach of the cage and the humidifier pad rotate through a reservoir 31 which is partially filled with water. The drum rotates in the direction of arrow 35 and as the humidifier pad passes through the reservoir water is picked up by the fibrous layer. The wetted portion of the pad must then travel through a vertical distance and the provision of zones or heat sealed junctures 7 prevents the water that is picked up in the fibrous mounds 9 from travelling downwardly across the zones along the length of the belt, such that the zones act as barriers to the downward flow of water. The water which is picked up and held in the fibrous layer is dispersed in fine droplets as indicated at 33 throughout the fibrous mounds. In the arrangement shown in FIG. 5 the air that is forced into the system through pipe 29 deflects off endwall 23 and outwardly through perforations 5 provided in the reinforcing layer into the fibrous layer where it vaporizes the water and carries it outwardly to the surrounding air. When working with an arrangement such as that shown in FIG. 6 incorporating endwall 40 some of the air is forced outwardly through the endwall. However, the air cannot escape through the endwall as fast as it is forced into the drum and there is a build up of air which then passes outwardly through the humidifier pad as explained above. The air that does pass through the endwall vaporizes the water which has been picked up and dispersed in fine droplets in the mounds of fibrous material 44 as the endwall rotates with the drum through the water reservoir. Heat-sealed junctures 46 again provide barriers to the downward flow of water through each of the mounds of material in fibrous layer 44 back to the water reservoir during the upward rotation of the endwall.

In cases where the air supplied through pipe 29 is itself humid some of the water in the humidifier pad will not be vaporized during the upward travel of the pad. Under these circumstances the drum will continue its rotation to the point where the mounds carrying the remaining non vaporized water then begin to travel downwardly towards the reservoir. However, the water that remains in the fibrous mounds is again prevented from flowing downwardly to the reservoir due to the provision of the heat-sealed junctures below each mound and continues to be vaporized during the downward travel of the pad. Therefore the heat-sealed junctures on either side of each mound are effective for maintaining the water within the mound during both the upward and the downward travel of the pad. As is the case with the humidifier pad itself some water may not be vaporized from the end wall during its upward rotation and that water which is left is maintained in dispersed form in the fibrous mounds during the downward rotation of the endwall and is prevented from flowing downwardly to the reservoir by the heat-sealed junctures.

As can be appreciated other methods of providing water barrier zones in the humidifier pad and/or the endwall can be used and such methods include the provision of zones made from high density materials, different from that forming the fibrous layer and fitted or pressed into the fibrous layer. Again such zones would substantially eliminate the flow of water downwardly back to the reservoir. This method would not necessarily require either the use of the reinforcing layer or the heat-sealing of the fibrous layer to the reinforcing layer and could employ suitable adhesives and the like to secure the high density materials in place.

Although various preferred embodiments of the invention have been described herein detail it will be appreciated by those skilled in the art that variations may be made thereto without departing fom the spirit of the invention or the scope of the appendant claims.

The embodiment of the invention in which an exclusive property or privilege is claimed are defined as follows:

1. A humidifier pad provided with liquid flow inhibiting junctures for inhibiting the flow of liquid along the pad, said humidifier pad comprising a resilient plastic reinforcing layer and a fibrous layer being secured to the reinforcing layer by heat seals extending across the entire width of the pad and forming said junctures which are spaced along the length of the humidifier pad; the reinforcing layer being perforated to permit the passage of air therethrough to the fibrous layer, the fibrous material in the junctures being compressed and of increased density relative to the fibrous material between the junctures as a result of the heat sealing and being of sufficiently high density to substantially eliminate the flow of picked up water across each zone.

2. A humidifier pad provided with liquid flow inhibiting heat sealed junctures for inhibiting the flow of liquid along the pad, said humidifier pad comprising a strip of resilient material and a corresponding strip of fibrous material for picking up and dispersing water from a water reservoir, the fibrous layer being heat sealed to the strip of resilient material to form said junctures which are narrow and spaced from one another along the length of the pad, the heat sealed junctures extending across the entire width of the pad, the fibrous material in each juncture being of increased density relative to the fibrous in each juncture being of increased density relative to the fibrous material between each juncture as a result of the heat sealing and being sufficiently dense to essentially eliminate the flow of water across each juncture.

3. A humidifier pad as claimed in claim 1, wherein the reinforcing layer is made from vinyl.

4. A humidifier pad as claimed in claim 1, wherein the fibrous material is a non-woven polyester.

5. A humidifier pad as claimed in claim 2, including means for securing said pad in an endless configuration.

6. A humidifier pad as claimed in claim 5, wherein said means for securing the pad in an endless configuration consists of reusable fastening pins extending through the pad.

7. The humidifier pad as claimed in claim 1 wherein said junctures are spaced from one another by about 1¼" and are in the range of ¼", in width.

8. A humidifier pad provided with liquid flow inhibiting zones for inhibiting the flow of liquid along the pad, said humidifier pad comprising a resilient reinforcing layer and a fibrous layer secured to the reinforcing layer, the reinforcing layer being perforated to permit the vaporization of water picked up and dispersed in the fibrous layer, the fibrous layer being provided with said zones which are spaced from one another along the length of the pad, each zone extending across substantially the entire width of the pad, the fibrous material in each zone being of increased density relative to the fibrous material between the zones and being sufficiently high to substantially eliminate the flow of picked up water across each zone.

9. A humidifier pad provided with liquid flow inhibiting zones for inhibiting the flow of liquid along the pad, said humidifier pad comprising a resilient reinforcing layer and a fibrous layer secured to the reinforcing layer, the reinforcing layer being perforated to permit the passage of air therethrough to vaporize water picked up and dispersed in the fibrous layer, the fibrous material being compressed in said zones which are spaced from one another along the length of the pad, each zone extending across substantially the entire width of the pad, the fibrous material in each zone being of increased density relative to the fibrous material between each zone and being sufficiently high to substantially eliminate the flow of picked up water across each zone.

10. Humidifier pad endwall means provided with liquid flow inhibiting zones and for use as a replacement for a solid endwall on a humidifier drum, said humidifier pad endwall means comprising a generally circular resilient reinforcing layer and correspondingly shaped fibrous layer secured to the reinforcing layer at said liquid flow inhibiting zones, said reinforcing layer being perforated to permit the vaporization of water picked up and dispersed in the fibrous layer, said zones being provided in the fibrous layer and being of high density for substantially eliminating the flow of picked up water thereacross, said zones extending from a central region of the humidifier pad endwall means and diverging outwardly from one another to its periphery to extend across substantially the entire radius of said humidifier pad endwall.

11. A humidifier pad endwall means as defined in claim 10 wherein said fibrous layer is heat-sealed to said reinforcing layer to provide the high density liquid flow inhibiting zones.

12. A humidifier pad endwall means as defined in claim 11 wherein said resilient reinforcing layer is a vinyl material and said fibrous layer is non-woven polyester material.

* * * * *